United States Patent
Archer

(10) Patent No.: US 9,373,213 B1
(45) Date of Patent: Jun. 21, 2016

(54) ADAPTIVE OBJECT PLACEMENT IN COMPUTER-IMPLEMENTED GAMES

(75) Inventor: Andrew Dominic Archer, Vallejo, CA (US)

(73) Assignee: Zynga Inc., San Francisco, CA (US)

( * ) Notice: Subject to any disclaimer, the term of this patent is extended or adjusted under 35 U.S.C. 154(b) by 549 days.

(21) Appl. No.: 13/478,217

(22) Filed: May 23, 2012

Related U.S. Application Data

(60) Provisional application No. 61/556,920, filed on Nov. 8, 2011.

(51) Int. Cl.
*G07F 17/32* (2006.01)

(52) U.S. Cl.
CPC .................................. *G07F 17/32* (2013.01)

(58) Field of Classification Search
None
See application file for complete search history.

(56) References Cited

U.S. PATENT DOCUMENTS

| | | | | |
|---|---|---|---|---|
| 5,769,716 | A * | 6/1998 | Saffari et al. | 463/20 |
| 6,769,987 | B1 * | 8/2004 | Morita et al. | 463/31 |
| 8,464,181 | B1 * | 6/2013 | Bailiang et al. | 715/848 |
| 8,485,897 | B1 * | 7/2013 | Marsland et al. | 463/31 |
| 2002/0196250 | A1 * | 12/2002 | Anderson et al. | 345/420 |
| 2003/0040350 | A1 * | 2/2003 | Nakata et al. | 463/9 |
| 2005/0043075 | A1 * | 2/2005 | Lin et al. | 463/9 |
| 2005/0277456 | A1 * | 12/2005 | Mizuguchi et al. | 463/7 |
| 2007/0287517 | A1 * | 12/2007 | Asuna et al. | 463/7 |

OTHER PUBLICATIONS

Stranno, 3d Tetris, Feb. 13, 2011, https://www.youtube.com/watch?v=4Kw9mks-wd8 , pp. 1-2.*

Nintendo, 3D Tetris Manual, 1987, pp. 1-28.*

"Screenshot of Sim City 4 (2003)", [Online]. Retrieved from the Internet: <URL: http://www.pcgameshardware.com/&menu=browser&mode+article&image_id=917823&article_id=662892&page=2>, (Accessed Aug. 23, 2012), 1 pg.

"Sim City", Wikipedia, [Online]. Retrieved from the Internet: <URL: en.wikipedia.org/wiki/SimCity>, (Accessed Aug. 23, 2012), 11 pgs.

"Age of Empires", Wikipedia, [Online]. Retrieved from the Internet: <URL: en.wikipedia.org/wiki/Age_of_Empires>, (Accessed Jul. 24, 2015), 15 pgs.

"Screenshot of Age of Empires II", [Online]. Retrieved from the Internet: <URL: www.gamefaqs.com/pc/63605-age-of-empires-ii-the-age-of-kings/images/screen-12>, (Accessed Jul. 24, 2015), 4 pgs.

"SimFarm", Wikipedia, [Online]. Retrieved from the Internet: <URL: en.wikipedia.org/wiki/SimFarm>, (Accessed Jul. 24, 2015), 2 pgs.

\* cited by examiner

*Primary Examiner* — Tramar Harper

(74) *Attorney, Agent, or Firm* — Schwegman, Lundberg & Woessner, P.A.

(57) ABSTRACT

Disclosed in some examples are systems, methods, and machine readable mediums which allow for efficient and dynamic adaptation of one or more game objects based upon a proximity to another game object. In some examples, placement (or movement) of a game object may trigger a proximity check wherein the game map is checked to determine a set of game objects which are within a predefined proximity to the placed game object which may affect the behavior or appearance of the game object. The appropriate adaptations (if any) may be determined using a lookup table or other rule set where the inputs include the set of game objects and the locations of each of the game objects in the set relative to the placed object.

22 Claims, 13 Drawing Sheets

5000

ADAPTIVE OBJECT PLACEMENT IN COMPUTER-IMPLEMENTED GAMES

CLAIM OF PRIORITY

This patent application claims the benefit of priority, under 35 U.S.C. Section 119(e), to U.S. Provisional Patent Application Ser. No. 61/556,920, entitled "Adaptive Object Placement in Computer-Implemented Games," filed on Nov. 8, 2011, which is hereby incorporated by reference herein in its entirety.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright Zynga, Inc., All Rights Reserved.

TECHNICAL FIELD

This disclosure generally relates to games and applications in general and in particular to computer-implemented online games, such as online role-playing games (RPGs), playable by more than one person from more than one location.

BACKGROUND

Map-based computer games generally involve visually representing a virtual in-game environment or virtual world of a game instance in the game through a map-based perspective. Typically, this involves displaying the virtual world as a plane (e.g., rendered isometrically or three-dimensionally) on which various game objects are displayed in certain spatial locations relative to other game objects. A player of the game navigates a player character throughout the world by utilizing one or more inputs. The graphical image of the player character may be moved in response to those inputs on the map. The virtual in-game environment may be customized or changed by the placement of predefined game objects in chosen locations on the map.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
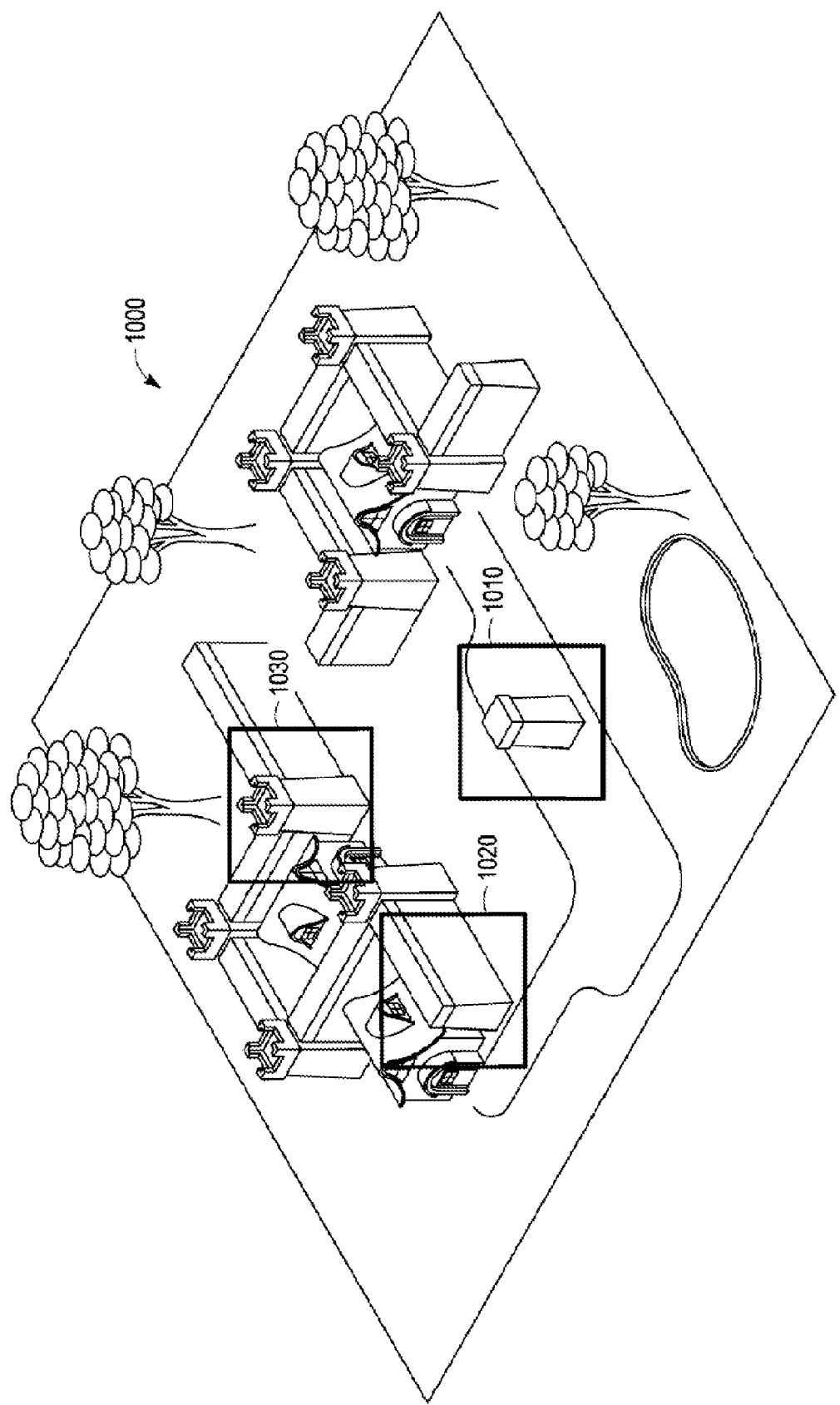
FIG. 1 shows a line drawing representation of a screenshot showing adaptive objects in various forms of adaptation according to some examples of the present disclosure.

The look, feel, or behavior of one or more game objects may be modified based upon its proximity to one or more other game objects. For example, a single piece of road section may be displayed as having a rounded off dead-end, but in proximity to another road section the two sections may be automatically connected and may cause the combined road section to function in a connected manner. Other examples include irrigating one or more crops based on proximity to a water feature.

Disclosed in some examples are systems, methods, and machine-readable mediums which allow for efficient and dynamic adaptation of one or more game objects based upon a proximity to another game object. In some examples, placement (or movement) of a game object may trigger a proximity check wherein the game map is checked to determine a set of game objects which are within a predefined proximity to the placed game object which may affect the behavior or appearance of the game object. In some examples, the set of game objects which may affect the behavior or appearance of the game object may comprise objects of the same type as the placed object. In other examples, the objects in the game may be categorized and the set of game objects which may affect the behavior or appearance of the placed game object may comprise objects within the same category of objects as the placed object. The appropriate adaptations (if any) may be determined using a lookup table or other rule set where the inputs include the set of game objects and the locations of each of the game objects in the set relative to the placed object. Other game objects in the set may be adapted as well as a result of the placement of the game object (e.g., a water feature added after crops may still affect the crops in the same way as if the crops were added after the water feature). Therefore, a recursive update function may then be triggered which checks whether each object in a predefined proximity to the placed game object needs to be adapted as a result of the placement of the game object. If a particular game object needs to be adapted, the set of objects within a predefined proximity to that particular game object in the set is checked and so on until all objects are adapted. If a particular game object does not need to be adapted, no further checking is done with respect to that particular object (e.g., the recursive branch ends).

In some examples, if the predefined proximity is defined as directly adjacent game objects, the adaptive system may see performance gains in that upon placement of a game object, object adaptations recursively spread outward from the placed game object to only affected game objects of the same category. Thus only the most likely affected game objects are checked for adaptations, as opposed to checking each game object on the map to determine whether or not it is to be updated. In addition, checking only for game objects within a predefined category also saves time in that the lookup table or other rule set need not be consulted for every object within the proximity of the placed object. The use of categories to check for adaptations may also allow for game objects which are of different types to adapt to each other. Thus a gravel road may merge seamlessly with a paved road.

A game object may be any virtual in-game element which may contribute to the look, feel, or playability of the game which are visually represented in the game. Game objects may include interactive and non-interactive elements. Game objects may be represented by one or more data structures which may store properties about the game objects such as its state, its position in the virtual world, its behavior, its graphical representation, and the like. Game objects may include in-game entities like roads, bridges, water features, and the like. As used herein, the terms "game object" or "in-game object" do not include other player characters or non-player characters.

An adaptive game object may be a game object which may have one or more of its properties, behaviors, or appearance automatically updated by the game as a result of being in proximity to another game object of an associated type or in an associated category of objects. In some examples, adaptations may be limited to adaptations of a newly placed game object, while in other examples, pre-existing game objects may also be adapted responsive to proximate or adjacent placement of a new game object. In some examples, the adaptations are immediate upon placement of an adaptive game object and in other examples, the adaptations may be delayed. For example, immediately upon placement of a crop in proximity to a water feature the crop may be irrigated. In other examples, the crop may be irrigated after a predefined amount of time.

In some examples the map may be divided into a plurality of sub section shapes or areas which may be called "tiles." For example, the game board may be divided into a series of squares where each square may be described uniquely by a row and a column number. While in some examples, the tiles may be square shaped, in other examples, the tiles may be any shape used to divide the map into sub sections. Other example tile shapes include diamonds, hexagons, and the like. Tile boundaries may or may not be visible to a game player. These tiles may be used to locate one or more game objects inside the virtual world. For example, if the tiles are squares, each tile may have a row number and a column number. The position of a game object positioned on the board may be described by the unique tile description. For example, a game object may be described as placed at tile (2,4) wherein the two represents the row and four represents the column of the square tile where the game object is located. The proximity between two game objects may be defined with respect to a tile location. Thus for example, an adaptive object may be proximate another game object if it is located in one of the immediately touching adjacent tiles. In some examples, diagonally adjacent tiles may be considered immediately touching, but in other examples, diagonally adjacent tiles may not be considered immediately touching. In these examples, if the game object is located at tile (2,4) and proximate is defined as immediately adjacent, non-diagonal tiles, then any game objects in tiles (1,4), (3,4), (2,3), and (2,5) would be considered proximate. Other proximities may be used. For example, crops may be irrigated if they are immediately proximate to a water feature, but may also be irrigated if within a certain tile radius (e.g., within 2 tiles) of the water feature. Certain adaptations may occur based on a particular proximity, whereas other adaptations may occur based on a different (e.g., closer or further) proximity.

While the current disclosure discusses proximities in relation to tile distances, in yet other examples, proximity may be defined in relation to a computed distance between two game objects without the need for tiles. Thus for example, the game might define a distance between certain game objects and a threshold distance whereby two game objects would be considered proximate each other for purposes of adaptive characteristics based upon that threshold.

An example line drawing of the present disclosure is shown in FIG. 1. Game board 1000 represents a medieval world in which various houses, castle walls, water features and game characters are shown (note that the tile grid is not shown). Castle wall 1010 represents a single castle wall adaptive game object with no other castle wall adaptive game objects in proximity. Castle wall 1010 thus corresponds in appearance to a default appearance for in-game objects of a castle wall type. Castle wall segment 1020 represents a series of two or more castle wall adaptive game objects arranged in proximity. When placed in proximity to each other, the castle wall adaptive game objects adapt to form an appearance of a continuous wall as shown in FIG. 1. Placement of a new castle wall segment within a threshold proximity of an existing castle wall segment may result in an automatic adaptation of the appearance of the new castle wall segment and an automatic adaptation of the appearance of the old castle wall segment, such that the two segments appear as a continuous wall 1020.

In some examples, the adaptation of the adaptive game object chosen may depend on the location and positioning of other adaptive objects to the placed object. For example, a castle wall segment placed in a target location which has another castle wall object to the north may form a wall segment such as wall segment 1020. However, if another castle wall game object is placed at a ninety degree angle to the previously placed castle wall objects (e.g., placed to the east or west), the previously placed castle wall segment may be adapted to become a corner tower 1030. Corner tower 1030 may be a connection of one or more castle wall adaptive game objects or segments at a right angle. Corner tower 1030 is formed by connecting two castle wall adaptive game object segments at a right angle to each other and is formed automatically by the game (e.g., the player simply places castle wall segments and does not have to select a specific corner piece for joining corners).

While FIG. 1 showed adaptations in the form of a change in appearance of game objects (e.g., connecting adjacent sections of castle wall), in other examples, one or more game play behaviors of the adjacent game objects and the placed game object may change. Game play behaviors may be one or more properties of the objects which control the object's functionality within the rules of the game. For example, in FIG. 1, connected castle walls may be stronger than a single castle wall and thus more likely to withstand an attack from in game characters. In other examples, crops placed near water may require less irrigation or may grow better. In still other examples, connected roads may allow for traffic across them where single roads may not.

Figure 2:
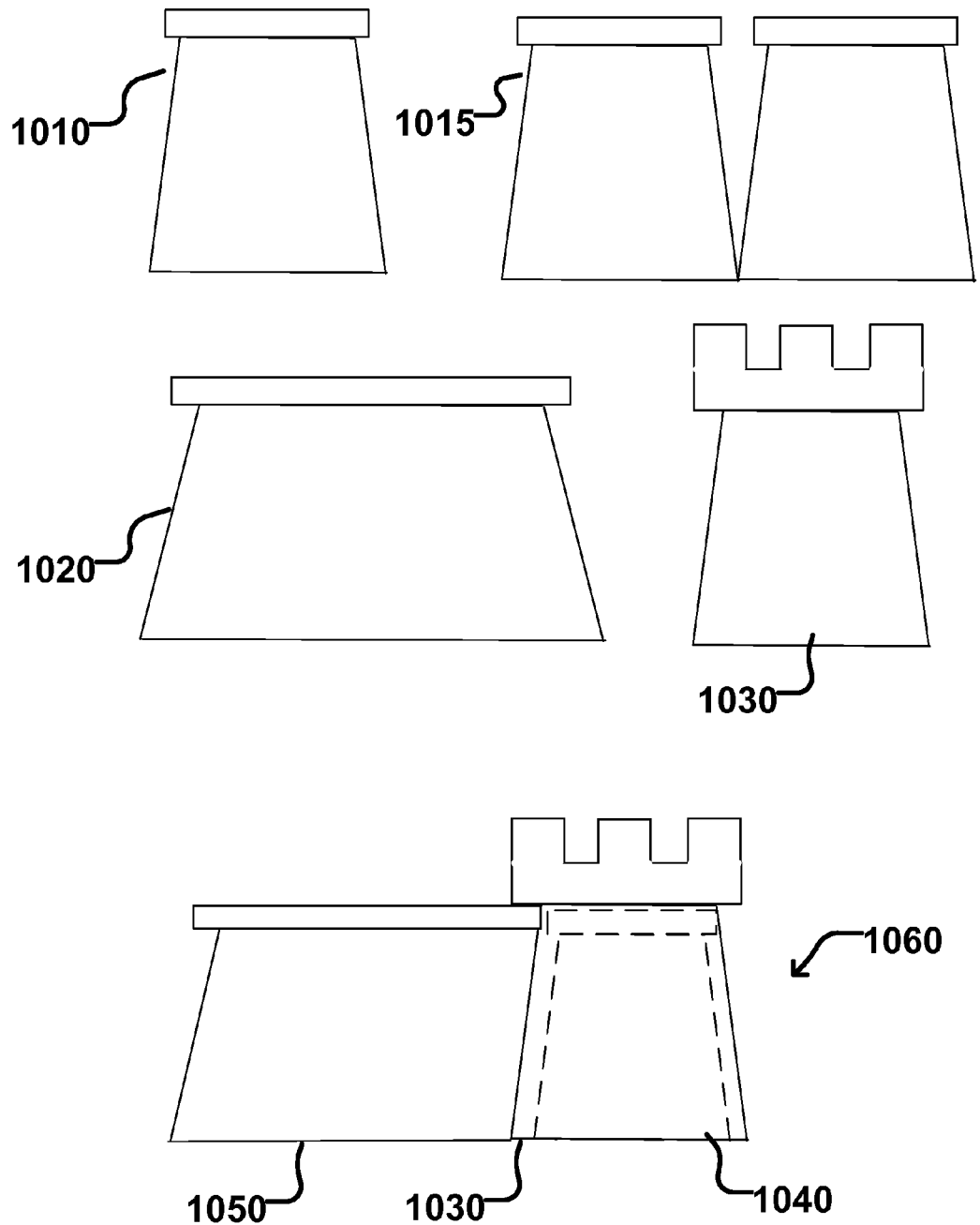
FIG. 2 shows various example schematics of an adaptive game object according to some examples of the present disclosure.

FIG. 2 shows simplified side-view line drawings of the various castle wall segments. Item 1010 shows the appearance of a single castle wall adaptive game object. Item 1015 shows the appearance of two castle wall segments 1010 placed next to each other without the adaptive changes. Item 1020 shows an example of the adaptive appearance modifications when two adaptive castle wall objects are placed next to each other to produce a smoothly extending elongated wall segment. Item 1030 shows a view of the castle tower which is adaptively formed when two castle walls connect at a ninety degree angle to each other. Also shown 1060 is a view of what the castle tower looks like connected to the two perpendicular castle wall segments (1040—behind the castle tower and shown as a dotted line, and 1050).

The adaptive nature of the game objects may not be limited to adaptations of the game object in response to proximity to game objects of the same type only, but may extend to game objects in a category of game objects. For example, a dirt path may merge seamlessly with a paved road. Each specific type of game object (e.g., a paved road, rubble wall, castle wall, or the like) may be associated with one or more game object categories. A game object category may contain a plurality of game objects which may be similar or may include common features or whose proximity may influence the behavior or appearance of one another. In other examples, the particular category may have similar in-game functionality, but differing at least in general appearance. For example, a category for walls may include straw wall objects, rubble wall objects, brick wall objects, castle wall objects, or the like. A category for transportation infrastructure might include dirt path objects, gravel road objects, cobblestone road objects, paved road objects, and the like. In some examples, the different types of objects within a specific category may merge seamlessly. Thus for example, a single adaptive paved road object as placed in the game may terminate on each edge as a rounded edge and traffic on the road may not be allowed to go past the end of the road. However, if the game player adds a gravel road in a tile adjacent to the paved road, the paved road may adapt such that it connects with the gravel road. While in some examples, this may be a hard transition (e.g., the paved road abruptly transitions to the gravel road), in further examples, the newly placed gravel road object may automatically adapt to provide transition tile or tiles which may gradually transition the road from paved to gravel (e.g., tiles which appear part paved and part gravel). Additionally, the behavior of the two sections may be linked. Thus for example, the traffic on the paved road may be able to continue travelling on the gravel road.

Figure 3:
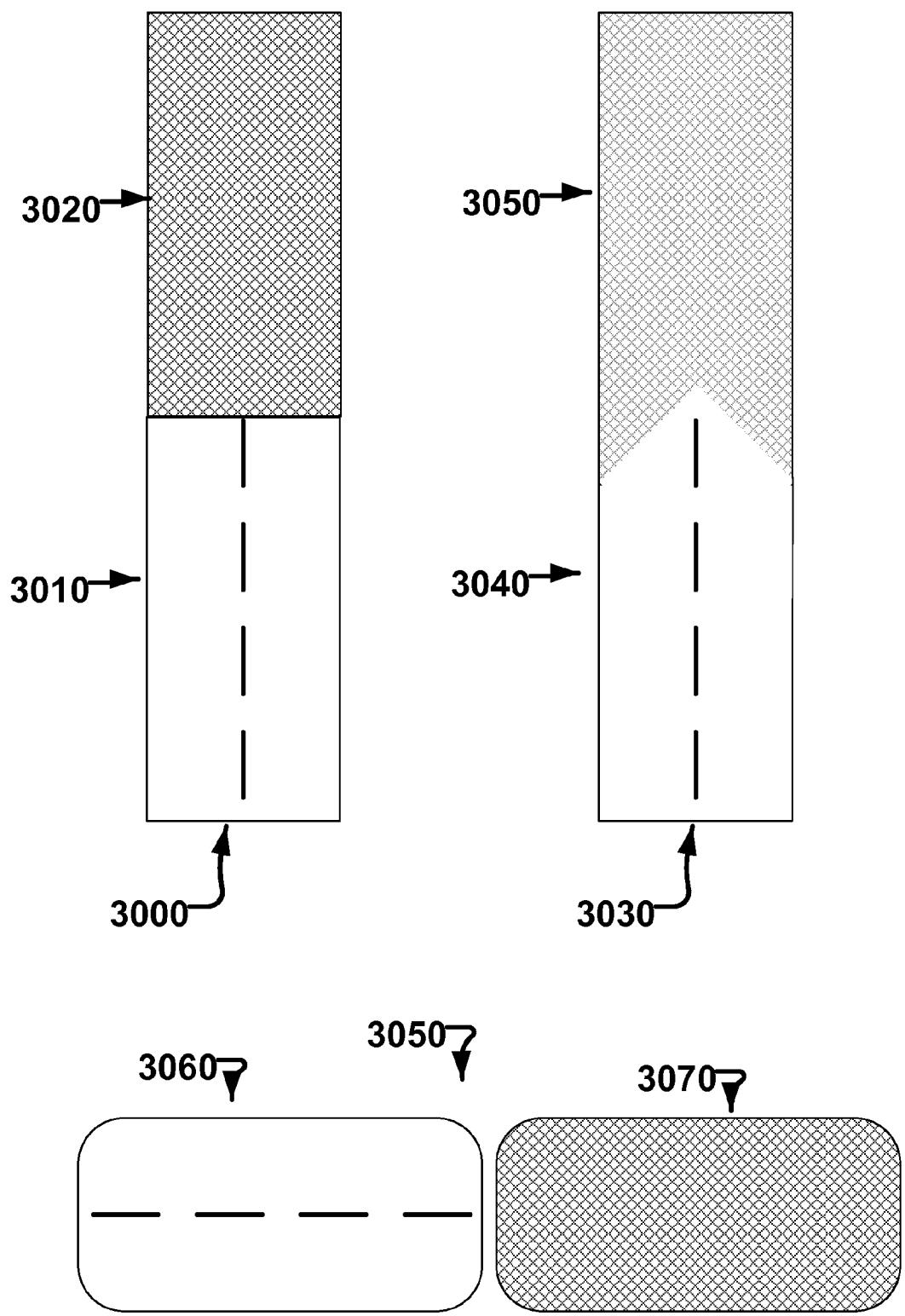
FIG. 3 shows various example schematics of adaptive game objects of different types connecting according to some examples of the present disclosure.

FIG. 3 shows two example objects adapting to different object types within the same category. Transition 3000 shows a hard transition where paved road segment 3010 abruptly connects with gravel road section 3020. Transition 3030 shows a smoother transition where paved road section 3040 gradually transforms into gravel road section 3050. Transition 3050 shows the transition between a gravel road and a paved road without adaptations. Both paved road section 3060 and gravel road section 3070 fail to connect and have rounded off edges suggesting that the road ends.

Figure 4:
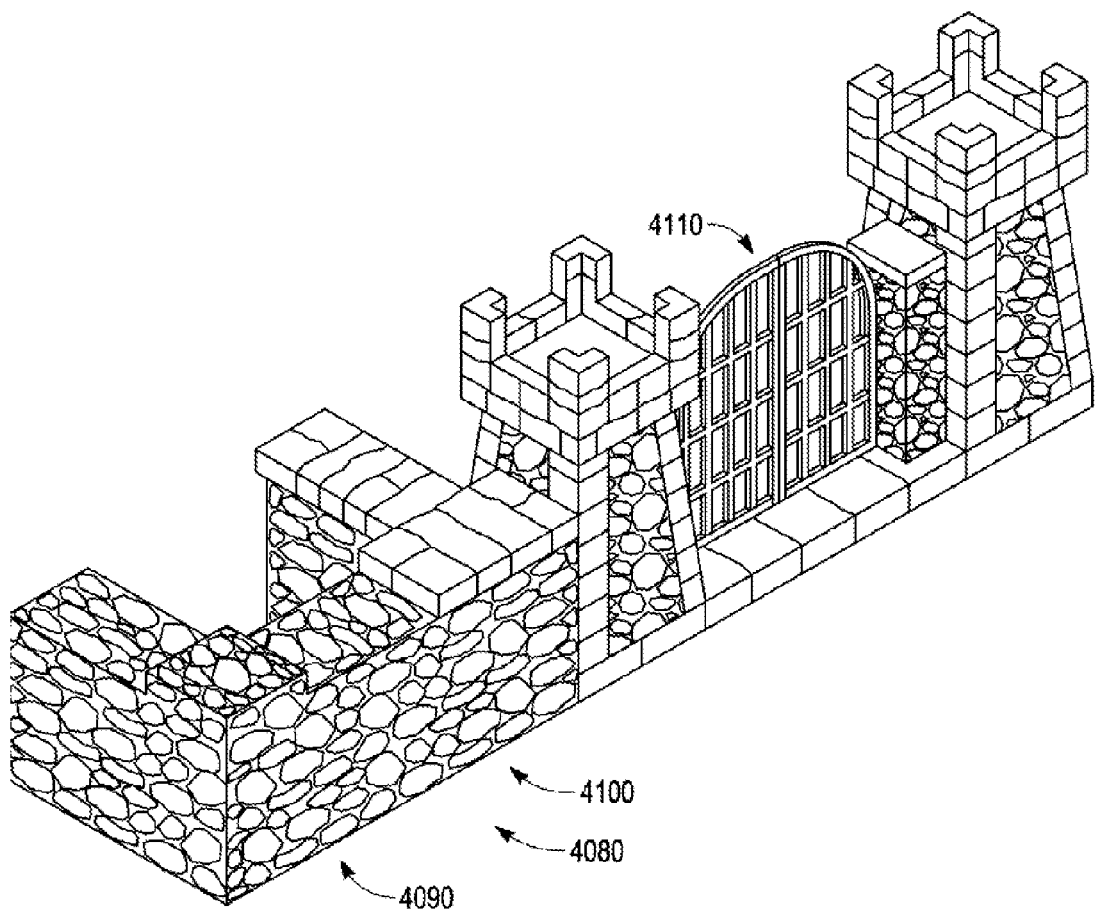
FIG. 4 shows a line drawing representation of a screenshot of various adaptive game objects of different types connecting according to some examples of the present disclosure.

FIG. 4 shows an example line drawing representation of a screenshot of two instances of two different types of objects adapting to each other. Transition 4080 shows a rubble wall segment 4090 and a castle wall segment 4100 joining in a hard transition. Notice how the walls meet each other evenly. Additionally gate 4110 transitions with segment 4100 joining in a hard transition. Notice how the walls meet each other evenly. Additionally gate 4110 transitions nicely with castle wall segment 4100.

Each game object may include a category identification in its data structure which may identify the category to which it belongs. When checking proximate game objects, the game may only have to compare the category of the placed game object to the category of the proximate game object to determine if an adaptation is necessary. This is in contrast to checking for specific game object types in complicated if-then-else statements and is therefore faster. After all the proximate objects which have a category which matches the placed game object are located, a table or rule-set may be consulted to determine the appropriate adaptation.

In some examples, multiple object categories might be associated with each other with a dependency relationship. In these examples, one category may have a dependent relationship with another category. In these examples, for ease of description, the category with the dependency relationship may be referred to as dependent category (and objects within that category may be referred to as dependent objects) and the category with which the dependent category is dependent upon may be considered the parent category (and the parent objects). In these examples, the dependent objects may adapt to objects in the parent category, but not vice versa. For example, a decoration category which may be dependent on a wall category might include one or more decorations which when placed next to a wall may adapt to the shape and configuration of the wall so as to appear to be "decorating" the wall. Thus for example, a decoration on a castle wall might follow the contours of the castle wall and include special decorations for the corner towers. In contrast, the decoration for a different type of wall may be contoured to the different adaptations that exist for that wall. Another example would include having a crop category dependent on a water feature category. The crop category may adapt to be irrigated as a result of being placed in proximity to various water features; however the water features may not adapt as a result of a crop being placed nearby. In other examples, there may be multiple dependencies, in which case the system chooses the dependency based on whichever parent category is closest in proximity to the dependent objects, or, in the case of multiple different dependent categories being the same proximity to the dependent object, allow the user to select which object is the parent object for purposes of the adaptations.

In some examples, once a first placed object is adapted based on the set of proximate objects which are in the particular categories of objects with which the first placed object is a member or is dependent upon, each particular adaptive object in the set is then checked to determine whether any adaptations to that particular object are necessary based upon the proximate objects to that particular object which are in the particular categories of objects with which that particular object is a member or is dependent upon. This process may continue recursively until no more objects are updated. By checking only objects which are likely to be affected and within a particular category or categories of objects, the system may eliminate having to check every object in the game map to determine if the object should be updated.

Figure 5:
FIG. 5 shows a game map according to some examples of the present disclosure.

For example, turning now to FIG. 5, an example game map 5000 with a five tile wide by five tile height is shown with various game objects denoted as "A," "B," "C," "D," "E," and "P." Proximity is defined in this example as any object in the adjacent north, south, east, or west tiles (e.g., diagonal tiles are not proximate). If "P" is the placed adaptive object, then objects "A" and "C" are used to determine whether "P" is adapted ("E" is excluded since it fails the definition of proximate which excludes diagonal tiles). If objects "A" and "C" are both in the same category of object (or in a dependent category) as object "P," then "A" and "C" would be used to determine what (if any) adaptations "P" would take. If "P" is adapted, then "A" and "C" are checked to determine whether or not they should adapt as well. If "P" is not adapted, "A" and "C" may not be checked to determine if they should adapt (which may increase performance.) If "P" is adapted, then when "A" is checked, the proximate tiles that determine whether and how "A" is adapted would be "P" and "B." Assuming that "P," and "B," are both in the same category as "A," the system may determine whether or not to adapt "A" based upon "P" and "B." In the case of FIG. 5, if "A" is adapted, then "B" would be likewise checked (the proximate tile being "A"), otherwise "B" would not be checked (again, increasing performance). If "P" was adapted, "C" is also checked. The proximate tiles would include "E," "P," and "D." If "E" is not in the same category as "C," (and the categories of "E" and "C" are not in a dependency relationship) then "E" is not used to determine the adaptations, and "E" is therefore not checked (again, increasing performance). If "C" adapts, then "D" would be checked (with "C" as its proximate tiles), otherwise if "C" does not adapt, then "D" would not be checked (e.g., increasing performance). By recursively checking the various game objects by fanning out from the placed game object, the objects which are more likely to be adapted are checked first and objects unlikely to be adapted (e.g., objects further from the target location where the object is placed) may not need to be checked.

Figure 6A:
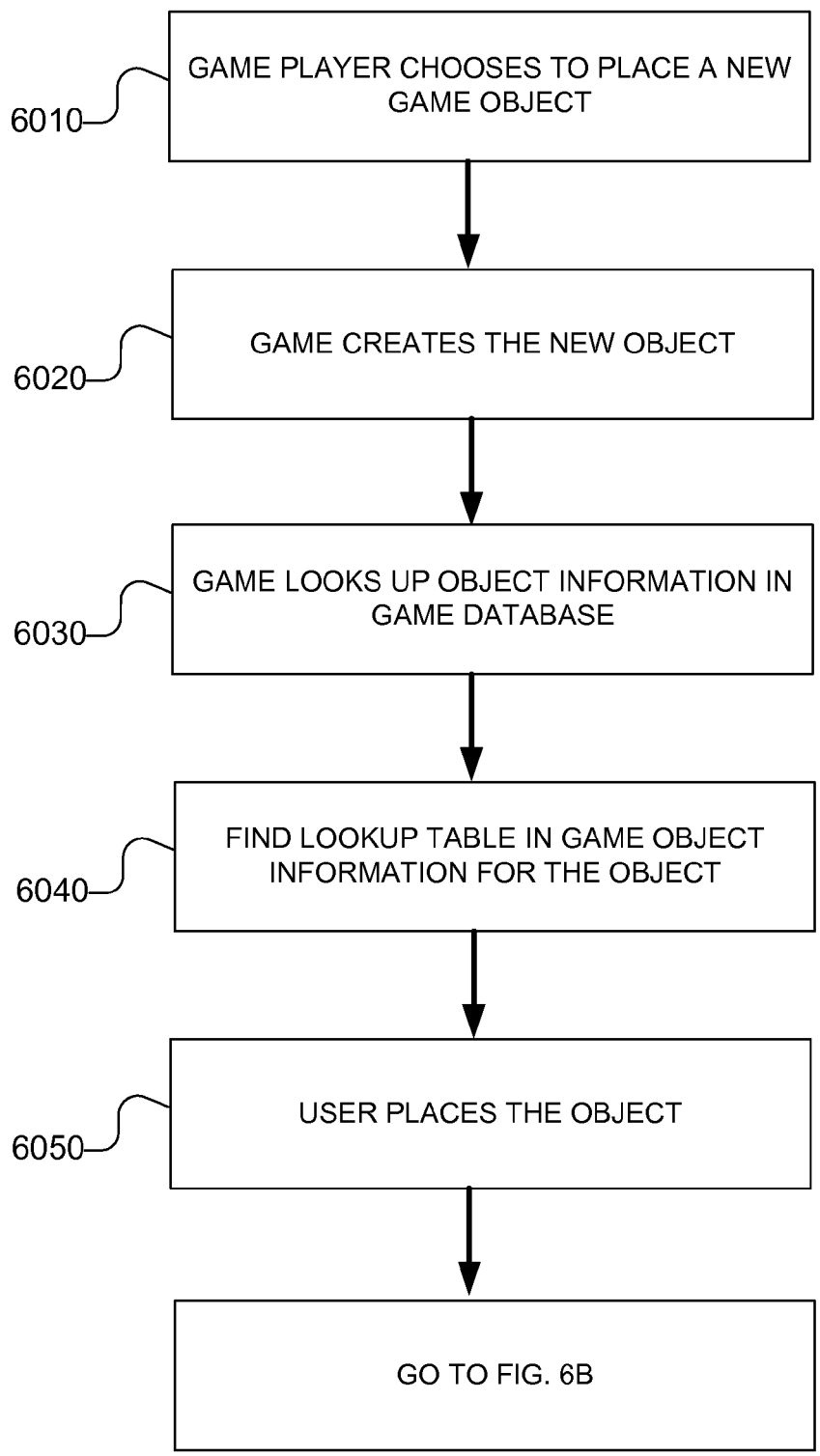
FIG. 6A shows a flowchart of a method of adapting the game objects according to some examples of the present disclosure.

Turning now to FIG. 6A, an example method of adapting a game object is shown. At operation 6010 a game player chooses to place a new game object inside the virtual in-game environment represented by the game map. At operation 6020 the game creates a new game object data structure (which may store attributes associated with the game object) and looks up various information about the object in the game database at operation 6030. At operation 6040 a lookup table may be located which may describe the image to be displayed given one or more adaptive neighbors and their locations.

Figure 6B:
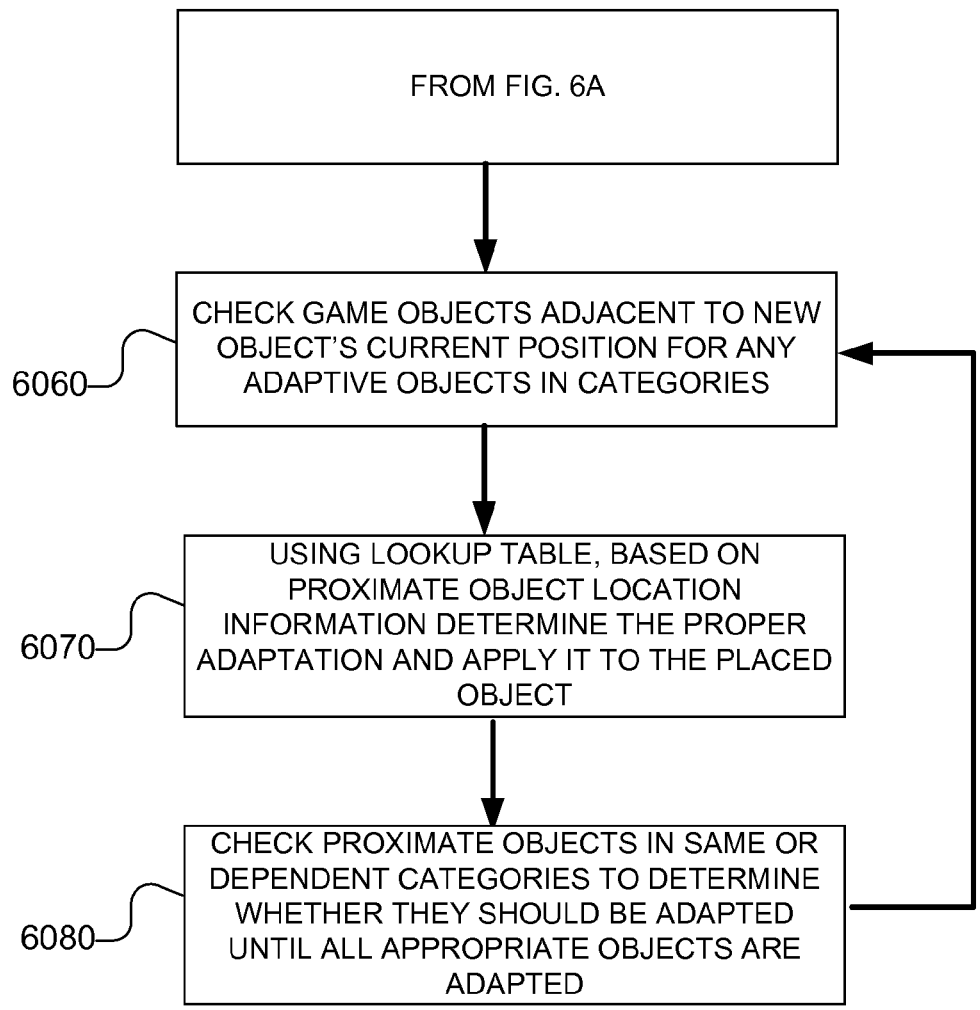
FIG. 6B shows a flowchart of a method of adapting the game objects according to some examples of the present disclosure.

The player may then position the object using one or more inputs to select a target position or tile in the map, and may then place the object in the target location, at operation 6050. Turning now to FIG. 6B, at operation 6060, whatever the current position of the object is, the map may be checked for other game objects within a particular proximity to the placed object which are in the same object category or for any parent object categories for which there is a dependency. If any adaptive objects are found, at operation 6070, the lookup table is consulted to determine the proper adaptations which are then applied to the object (e.g., through modification of one or more properties to the game object structure). At operation 6080, any of the proximate objects to the placed object which are in the same category or dependent categories may be recursively checked to determine whether their presentation or behavior is impacted. These objects may then go through the update process of operations 6060-6080, including, possibly notifying other proximate objects of the update. Thus each adaptive object may be recursively updated.

In other examples, this update process may be done realtime as the user positions the new object prior to final placement. Thus for example, the user may position (but not place) the object in a particular position and see the image of the object and the surrounding objects change based on the positioning. The user may then place the object at that location (finalizing the changes), or may move the object to a different location (undoing the changes). Such provisional placement with associated preview of object modification based on the proximity of adaptive objects to the target location may be implemented by drag-and-drop functionality in some embodiments. A user may thus select a particular default object or object type and may drag an icon representative of the new object to a target location. As the icon hovers over the target location, the icon or image representative of the new object may be dynamically adapted or modified to correspond to the modified appearance which it will have once it is dropped in the target location. Existing, previously placed objects may also update in response to the current location of the hovering icon. If the positioned object is then moved, the previously placed objects then may adapt back to their old appearances and/or behaviors. If the positioned object is then placed, the previously placed objects may then be permanently adapted.

In some examples, the lookup table may be used to determine which image to use and which new behaviors to set based on the associated category and dependent category neighbors. Thus for example, if the system determines that there is a castle wall to the south and a castle wall to the west, the table may indicate that a corner tower image should be placed. In other examples, the lookup table may specify one or more modifications to one or more game object properties. The system may then update the data structure of that particular game object to reflect the change in these properties.

Figure 7:
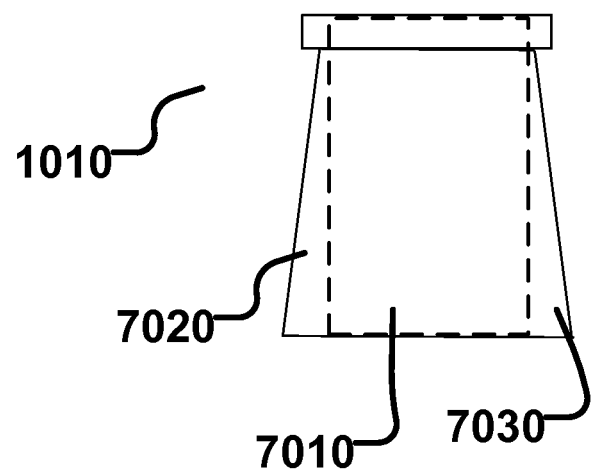
FIG. 7 shows a schematic of an adaptive game object according to some examples of the present disclosure.

In some examples, to reduce the number of images necessary to implement the adaptations, each game object image may constitute any number of component images. For example, each image for each tile may be further subdivided into a number of re-usable components. Thus for example, the castle wall 1010 may be a number of components and the adapted image of two connected castle wall adaptive game objects may be formed from one or more of the constituent image components. For example, FIG. 7 shows three constituent components of the base image of a castle wall 1010 (shown separated by a dotted line). Center section 7010, left side 7020, and right side 7030. When drawing the castle wall 1010 alone, all three may be rendered. However, when drawing two castle walls together, an additional center section 7010 may be drawn. This is in contrast to having separate large images for both a single castle wall and a double (or connected) castle wall.

Figure 8:
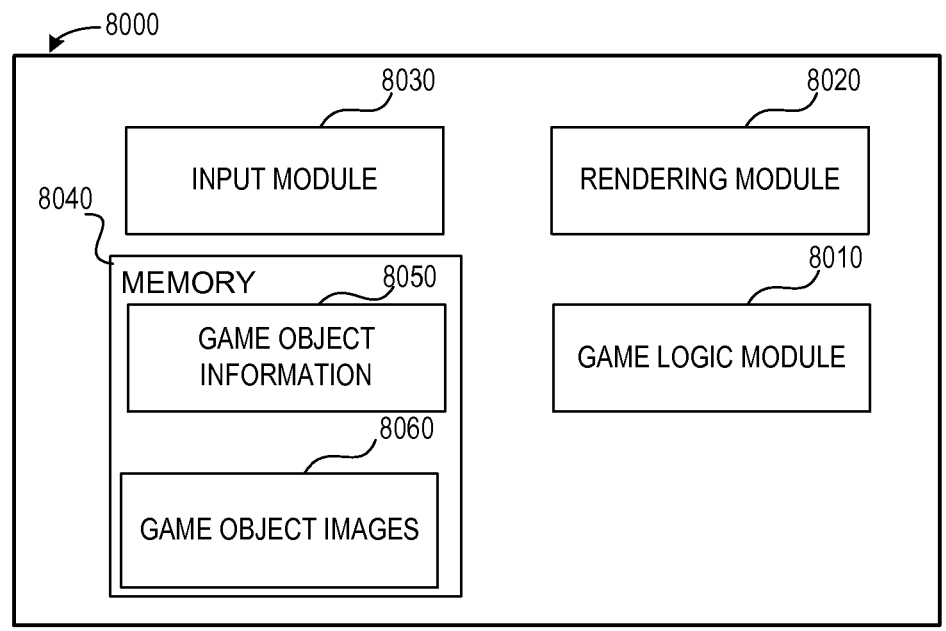
FIG. 8 shows a schematic of a gaming application according to some examples of the present disclosure.

An example schematic of a game 8000 is shown in FIG. 8. Game logic module 8010 comprises the algorithms and rules that control the display, presentation, and functionality of the game, including commanding the rendering module 8020 to render the game map and associated game objects to a display. Rendering module 8020 produces an output of the game map, game objects, game characters and other sprites onto the display in their proper position and orientation.

Input module 8030 may take as input one or more inputs from the game player and pass along the input to game logic module 8010. These inputs may include creating new game objects and placing those game objects. Game logic module 8010 may create new game objects and store information related to the game object in the game object information table 8050. Game object information table 8050 may also store one or more parameters and rules regarding the behavior of each possible game object, as well as state, behavior, or other information pertaining to all the game objects which have been created. For example, a default behavior for game objects may be stored in the game object information table and if game logic module 8010 detects that a game object is in proximity to a behavior modifying game object, the default behavior for only that object may be modified. For example, a crop game object may have a predetermined yield rate associated with it (e.g., a certain amount of crops per tile per amount of time may be harvested). This may be stored in the game object information table 8050. However, if game logic module 8010 detects that a particular crop object is placed near a water feature, the game logic module 8010 may increase the yield rate associated with only that game object. New crop game objects will still produce the default yield rate unless in proximity to a water feature. In addition to storing game object parameters for both default objects and for actual instantiations of game objects, the game object information may store a table for determining which of a set of one or more actions are to be taken based on an object's proximity to one or more other adaptive objects. Game logic module 8010 may consult the table in determining the appropriate actions to take when adapting the various game objects to any proximal adaptive objects.

Social Networking Based Games

While the above described disclosures may be applicable to any map-based computer game, in some examples, the game may be a network based game, which may also utilize social networking data. These games and there operation may be described below in more detail.

Figure 9:
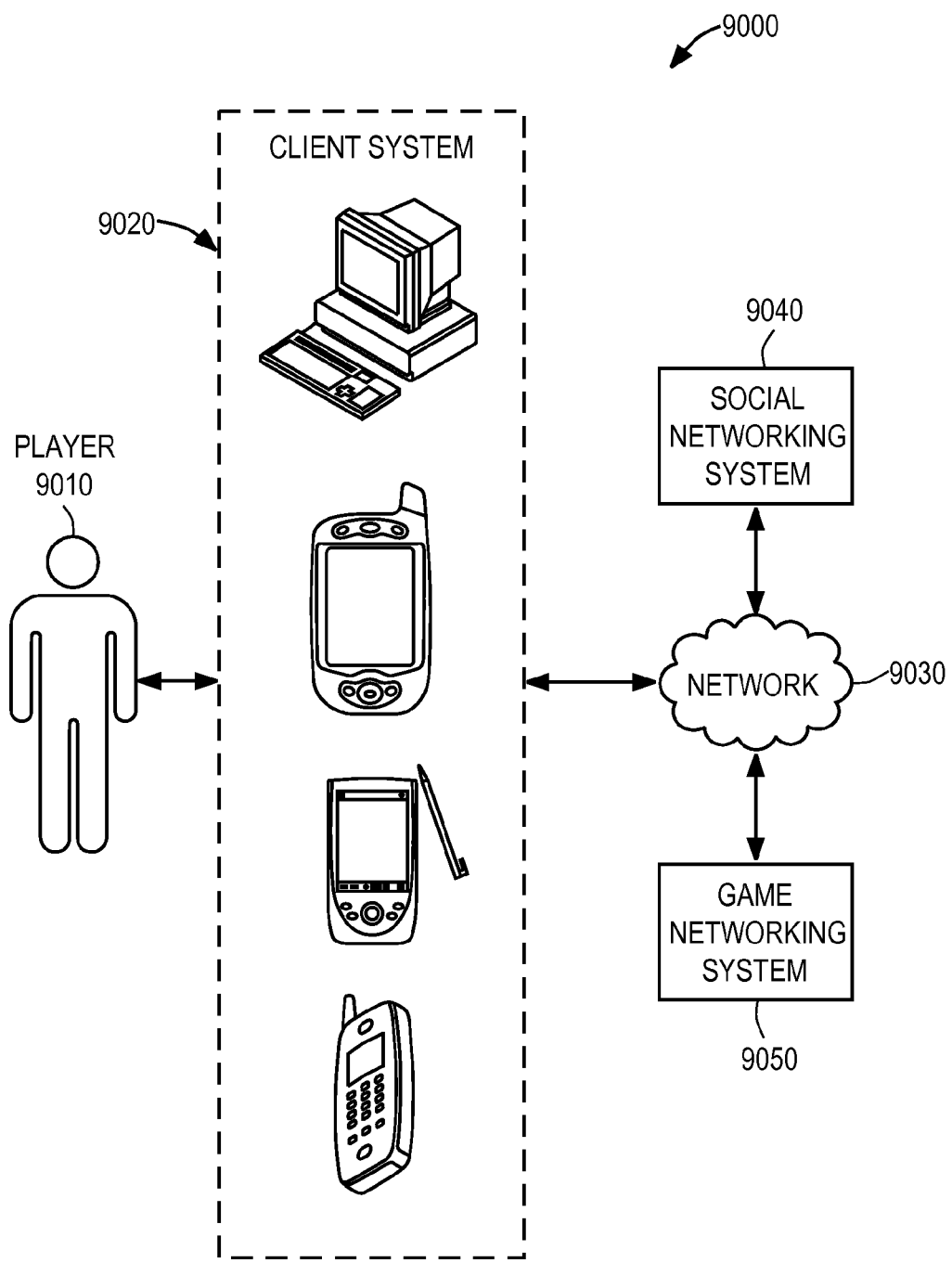
FIG. 9 shows a schematic of a gaming system according to some examples of the present disclosure.

FIG. 9 illustrates an example of a system 9000 for implementing various example embodiments, in connection with a user interface providing a network accessible game. In some embodiments, the system 9000 may comprise a game player 9010, a client device 9020, a network 9030, a social networking system 9040, and a game networking system 9050. The components of the system 9000 may be connected directly or over the network 9030, which may be any suitable network. In various embodiments, one or more portions of the network 9030 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or any other type of network, or a combination of two or more such networks.

The client device 9020 may be any suitable computing device (e.g., devices), such as a smart phone, a personal digital assistant (PDA), a mobile phone, a personal computer, a laptop, a computing tablet, and the like. The client device 9020 may access the social networking system 9040 or the game networking system 9050 directly, via the network 9030, or via a third-party system. For example, the client device 9020 may access the game networking system 9050 via the social networking system 9040. The player 9010 may use the client device 9020 to play the virtual game, within the user interface for the game.

The social networking system 9040 may include a network-addressable computing system that can host one or more social graphs, and may be accessed by the other components of system 9000 either directly or via the network 9030. The social networking system 9040 may generate, store, receive, and transmit social networking data. Moreover, the game networking system 9050 may include a network-addressable computing system (or systems) that can host one or more virtual games, for example, online games provided in Flash interactive displays. The game networking system 9050 may generate, store, receive, and transmit game-related data, such as, for example, game account data, game input, game state data, and game displays. The game networking system 9050 may be accessed by the other components of system 9000 either directly or via the network 9030. The player 9010 may use the client device 9020 to access, send data to, and receive data from the social networking system 9040 and/or the game networking system 9050.

Although FIG. 9 illustrates a particular example of the arrangement of the player 9010, the client device 9020, the social networking system 9040, the game networking system 9050, and the network 9030, this disclosure includes any suitable arrangement or configuration of the these components of system 9000.

Figure 10:
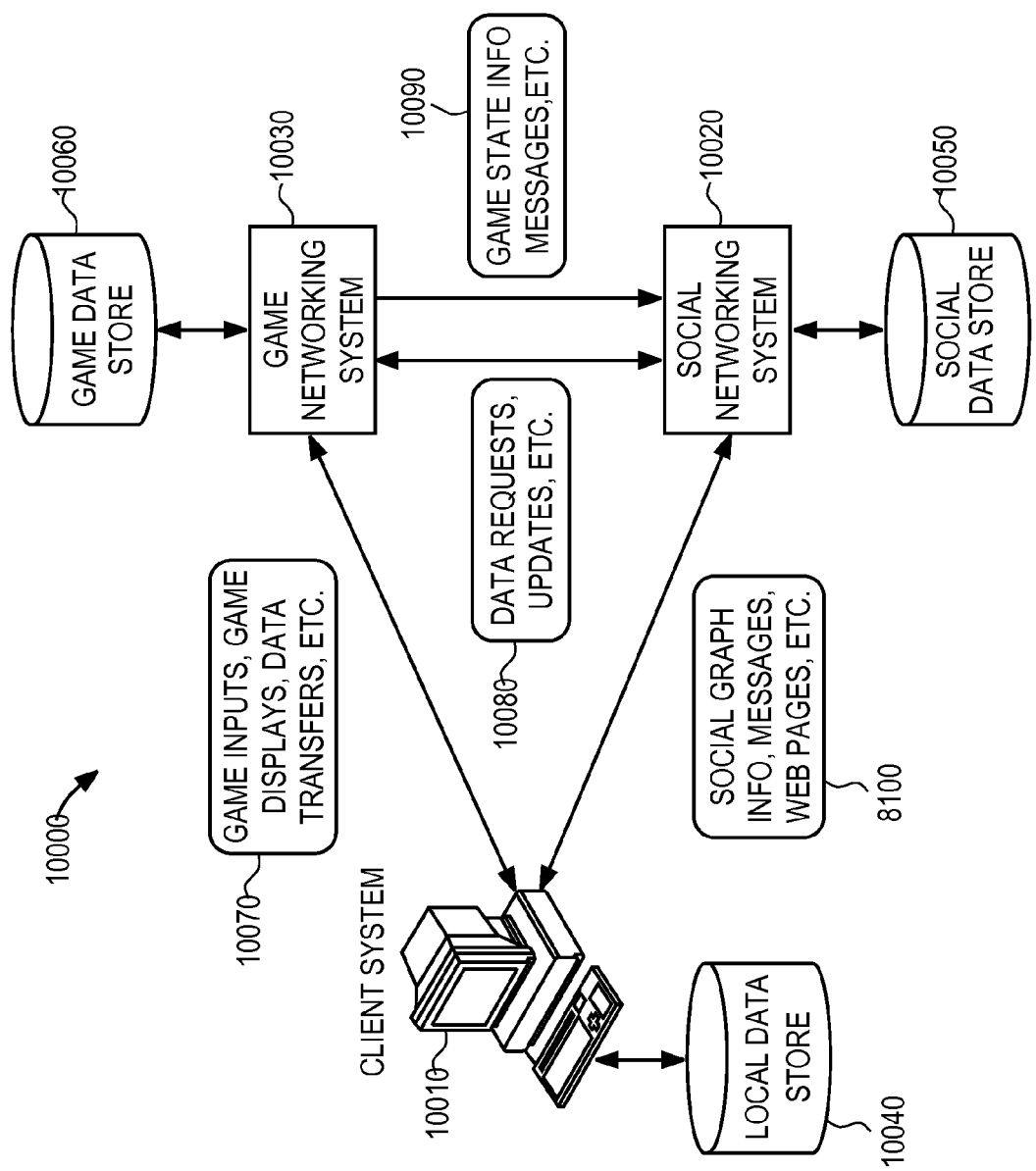
FIG. 10 shows a schematic data flow of a gaming system according to some examples of the present disclosure.

FIG. 10 illustrates an example data flow between the components of an example system 10000. In particular embodiments, system 10000 can include client system 10010, social networking system 10020, and game networking system 10030. A system 7000 such as that described with reference to FIG. 7 may be provided by the client system 10010, the social networking system 10020, or the game networking system 10030, or by any combination of these systems. The components of system 10000 can be connected to each other in any suitable configuration, using any suitable type of connection. The components may be connected directly or over any suitable network. Client system 10010, social networking system 10020, and game networking system 10030 can each have one or more corresponding data stores such as local data store 10040, social data store 10050, and game data store 10060, respectively. Social networking system 10020 and game networking system 10030 can also have one or more servers that can communicate with client system 10010 over an appropriate network. Social networking system 10020 and game networking system 10030 can have, for example, one or more Internet servers for communicating with client system 10010 via the Internet. Similarly, social networking system 10020 and game networking system 10030 can have one or more mobile servers for communicating with client system 10010 via a mobile network (e.g., GSM, PCS, Wi-Fi, WPAN, etc.). In some embodiments, one server may be able to communicate with client system 10010 over both the Internet and a mobile network. In other embodiments, separate servers can be used.

Client system 10010 can receive and transmit data 10070 to and from game networking system 10030. This data can include, for example, webpages, messages, game inputs, game displays, HTTP packets, data requests, transaction information, updates, and other suitable data. At some other time, or at the same time, game networking system 10030 can communicate data 10080, 10090 (e.g., game state information, game system account information, page info, messages, data requests, updates, etc.) with other networking systems, such as social networking system 10020 (e.g., Facebook, Myspace, Google+, etc.). Client system 10010 can also receive and transmit data 8100 to and from social networking system 10020. This data can include, for example, webpages, messages, social graph information, social network displays, HTTP packets, data requests, transaction information, updates, and other suitable data.

Communication between client system 10010, social networking system 10020, and game networking system 10030 can occur over any appropriate electronic communication medium or network using any suitable communications protocols. For example, client system 10010, as well as various servers of the systems described herein, may include Transport Control Protocol/Internet Protocol (TCP/IP) networking stacks to provide for datagram and transport functions. Of course, any other suitable network and transport layer protocols can be utilized.

In addition, hosts or end-systems described herein may use a variety of higher layer communications protocols, including client-server (or request-response) protocols, such as the HyperText Transfer Protocol (HTTP) and other communications protocols, such as HTTP-S, FTP, SNMP, TELNET, and a number of other protocols, may be used. In addition, a server in one interaction context may be a client in another interaction context. In particular embodiments, the information transmitted between hosts may be formatted as HyperText Markup Language (HTML) documents. Other structured document languages or formats can be used, such as XML and the like. Executable code objects, such as JavaScript and ActionScript, can also be embedded in the structured documents.

In some client-server protocols, such as the use of HTML over HTTP, a server generally transmits a response to a request from a client. The response may comprise one or more data objects. For example, the response may comprise a first data object, followed by subsequently transmitted data objects. In particular embodiments, a client request may cause a server to respond with a first data object, such as an HTML page, which itself refers to other data objects. A client application, such as a browser, will request these additional data objects as it parses or otherwise processes the first data object.

In particular embodiments, an instance of an online game can be stored as a set of game state parameters that characterize the state of various in-game objects, such as, for example, player character state parameters, non-player character parameters, and virtual item parameters. In particular embodiments, game state is maintained in a database as a serialized, unstructured string of text data as a so-called Binary Large Object (BLOB). When a player accesses an online game on game networking system 10030, the BLOB containing the game state for the instance corresponding to the player can be transmitted to client system 10010 for use by a client-side executed object to process. In particular embodiments, the client-side executable may be a FLASH-based game, which can de-serialize the game state data in the BLOB. As a player plays the game, the game logic implemented at client system 10010 maintains and modifies the various game state parameters locally. The client-side game logic may also batch game events, such as mouse clicks, and transmit these events to game networking system 10030. Game networking system 10030 may itself operate by retrieving a copy of the BLOB from a database or an intermediate memory cache (memcache) layer. Game networking system 10030 can also de-serialize the BLOB to resolve the game state parameters and execute its own game logic based on the events in the batch file of events transmitted by the client to synchronize the game state on the server side. Game networking system 10030 may then re-serialize the game state, now modified, into a BLOB, and pass this to a memory cache layer for lazy updates to a persistent database.

With a client-server environment in which the online games may run, one server system, such as game networking system 10030, may support multiple client systems 10010. At any given time, there may be multiple players at multiple client systems 10010 all playing the same online game. In practice, the number of players playing the same game at the same time may be very large. As the game progresses with each player, multiple players may provide different inputs to the online game at their respective client systems 10010, and multiple client systems 10010 may transmit multiple player inputs and/or game events to game networking system 10030 for further processing. In addition, multiple client systems 10010 may transmit other types of application data to game networking system 10030.

In particular embodiments, a computed-implemented game may be a text-based or turn-based game implemented as a series of web pages that are generated after a player selects one or more actions to perform. The web pages may be displayed in a browser client executed on client system 10010. As an example and not by way of limitation, a client application downloaded to client system 10010 may operate to serve a set of webpages to a player. As another example and not by way of limitation, a computer-implemented game may be an animated or rendered game executable as a stand-alone application or within the context of a webpage or other structured document. In particular embodiments, the computer-implemented game may be implemented using Adobe FLASH-based technologies. As an example and not by way of limitation, a game may be fully or partially implemented as a SWF object that is embedded in a web page and executable by a Flash media player plug-in. In particular embodiments, one or more described webpages may be associated with or accessed by social networking system 10020. This disclosure contemplates using any suitable application for the retrieval and rendering of structured documents hosted by any suitable network-addressable resource or website.

Application event data of a game is any data relevant to the game (e.g., player inputs). In particular embodiments, each application datum may have a name and a value, and the value of the application datum may change (i.e., be updated) at any time. When an update to an application datum occurs at client system 10010, either caused by an action of a game player or by the game logic itself, client system 10010 may need to inform game networking system 10030 of the update. For example, if the game is a farming game with a harvest mechanic (such as Zynga FarmVille), an event can correspond to a player clicking on a parcel of land to harvest a crop. In such an instance, the application event data may identify an event or action (e.g., harvest) and an object in the game to which the event or action applies. For illustration purposes and not by way of limitation, system 10000 is discussed in reference to updating a multi-player online game hosted on a network-addressable system (such as, for example, social networking system 10020 or game networking system 10030), where an instance of the online game is executed remotely on a client system 10010, which then transmits application event data to the hosting system such that the remote game server synchronizes the game state associated with the instance executed by the client system 10010.

In a particular embodiment, one or more objects of a game may be represented as an Adobe Flash object. Flash may manipulate vector and raster graphics, and supports bidirectional streaming of audio and video. "Flash" may mean the authoring environment, the player, or the application files. In particular embodiments, client system 10010 may include a Flash client. The Flash client may be configured to receive and run Flash application or game object code from any suitable networking system (such as, for example, social networking system 10020 or game networking system 10030). In particular embodiments, the Flash client may be run in a browser client executed on client system 10010. A player can interact with Flash objects using client system 10010 and the Flash client. The Flash objects can represent a variety of in-game objects. Thus, the player may perform various in-game actions on various in-game objects by making various changes and updates to the associated Flash objects. In particular embodiments, in-game actions can be initiated by clicking or similarly interacting with a Flash object that represents a particular in-game object. For example, a player can interact with a Flash object to use, move, rotate, delete, attack, shoot, or harvest an in-game object. This disclosure contemplates performing any suitable in-game action by interacting with any suitable Flash object. In particular embodiments, when the player makes a change to a Flash object representing an in-game object, the client-executed game logic may update one or more game state parameters associated with the in-game object. To ensure synchronization between the Flash object shown to the player at client system 10010, the Flash client may send the events that caused the game state changes to the in-game object to game networking system 10030. However, to expedite the processing and hence the speed of the overall gaming experience, the Flash client may collect a batch of some number of events or updates into a batch file. The number of events or updates may be determined by the Flash client dynamically or determined by game networking system 10030 based on server loads or other factors. For example, client system 10010 may send a batch file to game networking system 10030 whenever 50 updates have been collected or after a threshold period of time, such as every minute.

As used herein, the term "application event data" may refer to any data relevant to a computer-implemented game application that may affect one or more game state parameters, including, for example and without limitation, changes to player data or metadata, changes to player social connections or contacts, player inputs to the game, and events generated by the game logic. In particular embodiments, each application datum may have a name and a value. The value of an application datum may change at any time in response to the game play of a player or in response to the game engine (e.g., based on the game logic). In particular embodiments, an application data update occurs when the value of a specific application datum is changed. In particular embodiments, each application event datum may include an action or event name and a value (such as an object identifier). Thus, each application datum may be represented as a name-value pair in the batch file. The batch file may include a collection of name-value pairs representing the application data that have been updated at client system 10010. In particular embodiments, the batch file may be a text file and the name-value pairs may be in string format.

In particular embodiments, when a player plays an online game on client system 10010, game networking system 10030 may serialize all the game-related data, including, for example and without limitation, game states, game events, and user inputs, for this particular user and this particular game into a BLOB and store the BLOB in a database. The BLOB may be associated with an identifier that indicates that the BLOB contains the serialized game-related data for a particular player and a particular online game. In particular embodiments, while a player is not playing the online game, the corresponding BLOB may be stored in the database. This enables a player to stop playing the game at any time without losing the current state of the game the player is in. When a player resumes playing the game next time, game networking system 10030 may retrieve the corresponding BLOB from the database to determine the most-recent values of the game-related data. In particular embodiments, while a player is playing the online game, game networking system 10030 may also load the corresponding BLOB into a memory cache so that the game system may have faster access to the BLOB and the game-related data contained therein.

Systems and Methods

In particular embodiments, one or more described webpages may be associated with a networking system or networking service. However, alternate embodiments may have application to the retrieval and rendering of structured documents hosted by any type of network addressable resource or web site. Additionally, as used herein, a user may be an individual, a group, or an entity (such as a business or third party application).

Figure 11:
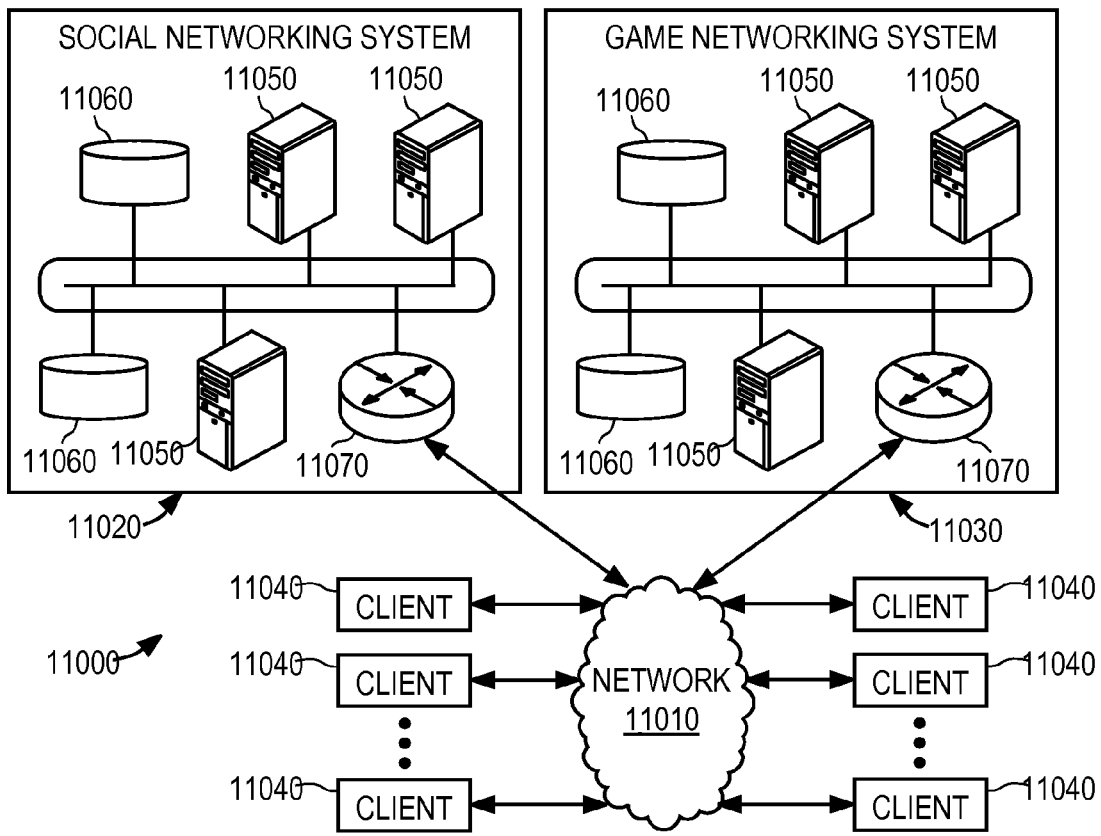
FIG. 11 shows a schematic of a gaming system according to some examples of the present disclosure.

Particular embodiments may operate in a WAN environment, such as the Internet, including multiple network addressable systems. FIG. 11 illustrates an example network environment 11000, in which various example embodiments may operate. Network cloud 11010 generally represents one or more interconnected networks, over which the systems and hosts described herein, can communicate. Network cloud 11010 may include packet-based WAN (such as the Internet), private networks, wireless networks, satellite networks, cellular networks, paging networks, and the like. As FIG. 11 illustrates, particular embodiments may operate in a network environment comprising one or more networking systems, such as social networking system 11020, game networking system 11030, and one or more client systems 11040. The components of social networking system 11020 and game networking system 11030 operate analogously; as such, hereinafter they may be referred to simply as a networking system. Client systems 11040 are operably connected to the network environment via a network service provider, a wireless carrier, or any other suitable means.

Networking system 11020, 11030 is a network addressable system that, in various example embodiments, comprises one or more physical servers 11050 and data stores 11060. The one or more physical servers 11050 are operably connected to computer network 11010 via, by way of example, a set of routers and/or networking switches 11070. In an example embodiment, the functionality hosted by the one or more physical servers 11050 may include web or HTTP servers, FTP servers, as well as, without limitation, webpages and applications implemented using Common Gateway Interface (CGI) script, PHP Hyper-text Preprocessor (PHP), Active Server Pages (ASP), Hyper Text Markup Language (HTML), Extensible Markup Language (XML), Java, JavaScript, Asynchronous JavaScript and XML (AJAX), Flash, Action-Script, and the like.

Physical servers 11050 may host functionality directed to the operations of networking system 11020, 11030. Hereinafter servers 11050 may be referred to as server 11050, although server 11050 may include numerous servers hosting, for example, networking system 11020, 11030, as well as other content distribution servers, data stores, and databases. Data store 11060 may store content and data relating to, and enabling, operation of networking system 11020, 11030 as digital data objects. A data object, in particular embodiments, is an item of digital information typically stored or embodied in a data file, database, or record. Content objects may take many forms, including: text (e.g., ASCII, SGML, HTML), images (e.g., jpeg, tif and gif), graphics (vector-based or bitmap), audio, video (e.g., mpeg), or other multimedia, and combinations thereof. Content object data may also include executable code objects (e.g., games executable within a browser window or frame), podcasts, and the like. Logically, data store 11060 corresponds to one or more of a variety of separate and integrated databases, such as relational databases and object-oriented databases, that maintain information as an integrated collection of logically related records or files stored on one or more physical systems. Structurally, data store 11060 may generally include one or more of a large class of data storage and management systems. In particular embodiments, data store 11060 may be implemented by any suitable physical system(s) including components, such as one or more database servers, mass storage media, media library systems, storage area networks, data storage clouds, and the like. In one example embodiment, data store 11060 includes one or more servers, databases (e.g., MySQL), and/or data warehouses. Data store 11060 may include data associated with different networking system 11020, 11030 users and/or client systems 11040.

Client system 11040 is generally a computer or computing device including functionality for communicating (e.g., remotely) over a computer network. Client system 11040 may be a desktop computer, laptop computer, personal digital assistant (PDA), in- or out-of-car navigation system, smart phone or other cellular or mobile phone, or mobile gaming device, among other suitable computing devices. Client system 11040 may execute one or more client applications, such as a web browser (e.g., Microsoft Internet Explorer, Mozilla Firefox, Apple Safari, Google Chrome, and Opera), to access and view content over a computer network. In particular embodiments, the client applications allow a user of client system 11040 to enter addresses of specific network resources to be retrieved, such as resources hosted by networking system 11020, 11030. These addresses can be Uniform Resource Locators (URLs) and the like. In addition, once a page or other resource has been retrieved, the client applications may provide access to other pages or records when the user "clicks" on hyperlinks to other resources. By way of example, such hyperlinks may be located within the webpages and provide an automated way for the user to enter the URL of another page and to retrieve that page.

A webpage or resource embedded within a webpage, which may itself include multiple embedded resources, may include data records, such as plain textual information, or more complex digitally encoded multimedia content, such as software programs or other code objects, graphics, images, audio signals, videos, and so forth. One prevalent markup language for creating webpages is the Hypertext Markup Language (HTML). Other common web browser-supported languages and technologies include the Extensible Markup Language (XML), the Extensible Hypertext Markup Language (XHTML), JavaScript, Flash, ActionScript, Cascading Style Sheet (CSS), and, frequently, Java. By way of example, HTML enables a page developer to create a structured document by denoting structural semantics for text and links, as well as images, web applications, and other objects that can be embedded within the page. Generally, a webpage may be delivered to a client as a static document; however, through the use of web elements embedded in the page, an interactive experience may be achieved with the page or a sequence of pages. During a user session at the client, the web browser interprets and displays the pages and associated resources received or retrieved from the website hosting the page, as well as, potentially, resources from other websites.

When a user at a client system 11040 desires to view a particular webpage (hereinafter also referred to as target structured document) hosted by networking system 11020, 11030, the user's web browser, or other document rendering engine or suitable client application, formulates and transmits a request to networking system 11020, 11030. The request generally includes a URL or other document identifier as well as metadata or other information. By way of example, the request may include information identifying the user, such as a user ID, as well as information identifying or characterizing the web browser or operating system running on the user's client computing device 11040. The request may also include location information identifying a geographic location of the user's client system or a logical network location of the user's client system. The request may also include a timestamp identifying when the request was transmitted.

Although the example network environment described above and illustrated in FIG. 11 is described with respect to social networking system 11020 and game networking system 11030, this disclosure encompasses any suitable network environment using any suitable systems. As an example and not by way of limitation, the network environment may include online media systems, online reviewing systems, online search engines, online advertising systems, or any combination of two or more such systems.

Modules, Components, and Logic

Certain embodiments are described herein as including logic or a number of components, modules, or mechanisms. Modules or components may constitute either software modules (e.g., code embodied (1) on a non-transitory machine-readable medium or (2) in a transmission signal) or hardware-implemented modules. A hardware-implemented module is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules may provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program may be written in any form of programming language, including compiled or interpreted languages, and it may be deployed in any form, including as a stand-alone program or as a module, subroutine, or other unit suitable for use in a computing environment. A computer program may be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations may also be performed by, and apparatus of example embodiments may be implemented as, special purpose logic circuitry, e.g., a field programmable gate array (FPGA) or an application-specific integrated circuit (ASIC).

The computing system may include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Implementation

Figure 12:
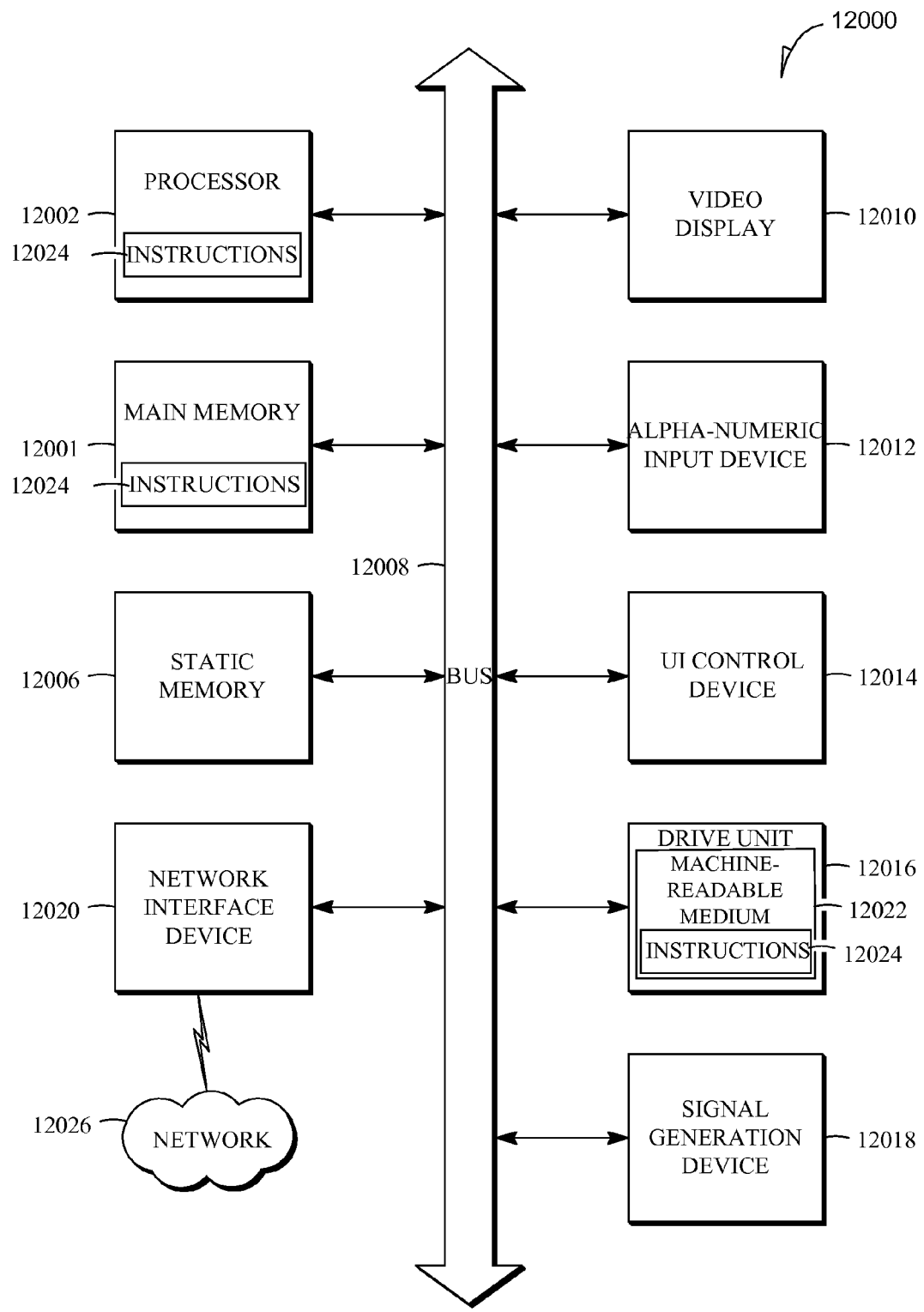
FIG. 12 shows a schematic of a machine implementation according to some examples of the present disclosure.

FIG. 12 shows a diagrammatic representation of a machine in the example form of a computer system 12000 within which a set of instructions for causing the machine to perform any one or more of the methods, processes, operations, or methodologies discussed herein may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a Personal Computer (PC), a tablet PC, a Set-Top Box (STB), a Personal Digital Assistant (PDA), a cellular telephone, a Web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Example embodiments may also be practiced in distributed system environments where local and remote computer systems which that are linked (e.g., either by hardwired, wireless, or a combination of hardwired and wireless connections) through a network, both perform tasks. In a distributed system environment, program modules may be located in both local and remote memory-storage devices (see below).

The example computer system 12000 includes a processor 12002 (e.g., a Central Processing Unit (CPU), a Graphics Processing Unit (GPU) or both), a main memory 12001 and a static memory 12006, which communicate with each other via a bus 12008. The computer system 12000 may further include a video display unit 12010 (e.g., a Liquid Crystal Display (LCD) or a Cathode Ray Tube (CRT)). The computer system 12000 also includes an alphanumeric input device 12012 (e.g., a keyboard), a User Interface (UI) controller 12014 (e.g., a mouse), a disk drive unit 12016, a signal generation device 12018 (e.g., a speaker) and a network interface device 12020 (e.g., a transmitter).

The disk drive unit 12016 includes a machine-readable medium 12022 on which is stored one or more sets of instructions 12024 and data structures (e.g., software) embodying or used by any one or more of the methodologies or functions illustrated herein. The software may also reside, completely or at least partially, within the main memory 12001 and/or within the processor 12002 during execution thereof by the computer system 12000, the main memory 12001 and the processor 10002 also constituting machine-readable media.

The instructions 12024 may further be transmitted or received over a network 12026 via the network interface device 12020 using any one of a number of well-known transfer protocols (e.g., HTTP, Session Initiation Protocol (SIP)).

The term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding, or carrying a set of instructions for execution by the machine and that cause the machine to perform any of the one or more of the methodologies illustrated herein. The term "machine-readable medium" shall accordingly be taken to include, but not be limited to, solid-state memories, and optical and magnetic medium.

Method embodiments illustrated herein may be computer-implemented. Some embodiments may include computer-readable media encoded with a computer program (e.g., software), which includes instructions operable to cause an electronic device to perform methods of various embodiments. A software implementation (or computer-implemented method) may include microcode, assembly language code, or a higher-level language code, which further may include computer readable instructions for performing various methods. The code may form portions of computer program products. Further, the code may be tangibly stored on one or more volatile or non-volatile computer-readable media during execution or at other times. These computer-readable media may include, but are not limited to, hard disks, removable magnetic disks, removable optical disks (e.g., compact disks and digital video disks), magnetic cassettes, memory cards or sticks, Random Access Memories (RAMs), Read Only Memories (ROMs), and the like.

Additional Notes and Examples

Disclosed in some examples is a method of placing game objects in a game, the method includes receiving user input that indicates a desired placement of a new game object at a target location in a virtual in-game environment of the computer-implemented game; identifying the new game object as a current game object; processing the current game object by: using one or more computer processors, determining for the current game object a set of proximate game objects which are within a threshold distance from the current game object; and adapting a property of the current game object based upon the set of proximate game objects within the threshold proximity distance; and for each particular game object in the set of proximate game objects, identifying that particular game object as the current game object and recursively processing the current game object.

Disclosed in some examples is a system for placing game objects in a game, the system including an input module configured to receive user input that indicates a desired placement of a new game object at a target location in a virtual in-game environment of the computer-implemented game; a game logic module configured to: identify the new game object as a current game object; process the current game object by: using one or more computer processors, determining for the current game object a set of proximate game objects which are within a threshold distance from the current game object; and adapting a property of the current game object based upon the set of proximate game objects within the threshold proximity distance; and for each particular game object in the set of proximate game objects, identifying that particular game object as the current game object and recursively processing the current game object.

Disclosed in yet other examples is a machine readable medium that stores instructions which when performed by a machine, cause the machine to perform the operations comprising: receiving user input that indicates a desired placement of a new game object at a target location in a virtual in-game environment of the computer-implemented game; identifying the new game object as a current game object; processing the current game object by: using one or more computer processors, determining for the current game object a set of proximate game objects which are within a threshold distance from the current game object; and adapting a property of the current game object based upon the set of proximate game objects within the threshold proximity distance; and for each particular game object in the set of proximate game objects, identifying that particular game object as the current game object and recursively processing the current game object.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. §1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. A method of placing game objects in a computer-implemented game comprising:
   providing a virtual in-game environment of the computer-implemented game and causing display on a user device of a three-dimensional map of at least part of the virtual in-game environment;
   receiving user input that indicates a desired placement of a new game object at a target location on a map of the virtual in-game environment;
   identifying the new game object as a current game object;
   in an automated operation performed using one or more processors configured to perform the automated operation, processing the current game object by:
      determining for the current game object a set of proximate game objects which are within a threshold distance from the current game object on the map;
      determining a display effect property of the current game object, the determining based upon the set of proximate game objects within the threshold proximity distance, wherein the threshold proximate distance defines instances where the area of the three dimensional map that is affected by the proximate game objects overlaps the area of the three dimensional map that is affected by the current game object, wherein the display effect property causes a change in a graphical output of the current game object over a subsequent time period;
      responsive to determining the display effect property of the current game object, modifying the display effect property of the current game object;
      for each particular game object in the set of proximate game objects, identifying that particular game object as the current game object and recursively processing the identified current game object; and
   causing an updated display on the user device of the current game object using the display effect property;
   wherein the display effect property of the current game object is dynamically variable based on a proximity distance between the current game object and the new game object on the map.

2. The method of claim 1, wherein processing the current game object comprises responsive to determining that the display effect property of the current game object should not be modified, setting the set of proximate game objects to an empty set.

3. The method of claim 1, comprising determining an association of the current game object with a first category of game objects, and wherein the set of proximate game objects is limited to game objects that form part of the first category of game objects.

4. The method of claim 3, wherein the first category includes at least two different types of game objects.

5. The method of claim 1, wherein modifying the display effect property of the current game object comprises modifying an appearance of the game object as displayed in the three-dimensional map-based perspective.

6. The method of claim 1, wherein modifying the display effect property of the current game object comprises modifying a game-play behavior of the current game object.

7. The method of claim 1, wherein modifying the display effect property comprises using a table and a positioning of the set of proximate objects relative to the target location to determine a new value for the display effect property of the new game object.

8. The method of claim 1, wherein the current game object is a crop and the display effect property is an irrigation property, and wherein modifying the irrigation property includes varying the irrigation property over time based on the proximity distance.

9. A system for placing game objects in a computer-implemented game, the system comprising:
   an input module comprising one or more computer processor devices configured to receive user input that indicates a desired placement of a new game object at a target location on a map of the virtual in-game environment;
   a game logic module comprising at least one computer processor device configured to:
      identify the new game object as a current game object;
      process the current game object by:
         using one or more computer processors, determining for the current game object a set of proximate game objects which are within a threshold distance from the current game object on the map;
         modifying a display effect property of the current game object based upon the set of proximate game objects within the threshold proximity distance, wherein the threshold proximate distance defines instances where the area of the three dimensional map that is affected by the proximate game objects overlaps the area of the three dimensional map that is affected by the current game object, wherein the display effect property causes a change in a graphical output of the current game object over a subsequent time period; and for each particular game object in the set of proximate game objects, identifying that particular game object as the current game object and recursively processing the identified current game object;

wherein the display effect property of the current game object is dynamically variable based on a proximity distance between the current game object and the new game object on the map.

10. The system of claim 9, wherein processing the current game object comprises responsive to determining that the display effect property of the current game object should not be modified, setting the set of proximate game objects to empty.

11. The system of claim 9, comprising determining an association of the current game object with a first category of game objects, and wherein the set of proximate game objects is limited to game objects that form part of the first category of game objects.

12. The system of claim 11, wherein the first category includes at least two different types of game objects.

13. The system of claim 9, wherein modifying the display effect property of the current game object comprises modifying an appearance of the game object as displayed in the three-dimensional map-based perspective.

14. The system of claim 9, wherein modifying the display effect property of the current game object comprises modifying a game-play behavior of the current game object.

15. The system of claim 9, wherein modifying the display effect property comprises using a table and a positioning of the set of proximate objects relative to the target location to determine a new value for the display effect property of the new game object.

16. A non-transitory machine-readable medium that stores instructions which when performed by a machine, cause the machine to perform the operations comprising:

providing a virtual in-game environment of the computer-implemented game and causing display on a user device of a three-dimensional map of at least part of the virtual in-game environment;

receiving user input that indicates a desired placement of a new game object at a target location on a map of the virtual in-game environment;

identifying the new game object as a current game object;

processing the current game object by:

determining for the current game object a set of proximate game objects which are within a threshold distance from the current game object on the map; and modifying a display effect property of the current game object based upon the set of proximate game objects within the threshold proximity distance, wherein the threshold proximate distance defines instances where the area of the three dimensional map that is affected by the proximate game objects overlaps the area of the three dimensional map that is affected by the current game object, wherein the display effect property causes a change in a graphical output of the current game object over a subsequent time period; and for each particular game object in the set of proximate game objects, identifying that particular game object as the current game object and recursively processing the identified current game object;

wherein the display effect property of the current game object is dynamically variable based on a proximity distance between the current game object and the new game object on the map.

17. The machine-readable medium of claim 16, wherein the instructions for processing the current game object comprise instructions that when performed by the machine, causes the machine to responsive to determining that the display effect property of the current game object should not be modified, setting the set of proximate game objects to empty.

18. The machine-readable medium of claim 16, wherein the instructions comprise instructions which when performed by the machine cause the machine to determine an association of the current game object with a first category of game objects, and wherein the set of proximate game objects is limited to game objects that form part of the first category of game objects.

19. The machine-readable medium of claim 18, wherein the first category includes at least two different types of game objects.

20. The machine-readable medium of claim 16, wherein modifying the display effect property of the current game object comprises adapting an appearance of the game object as displayed in the three-dimensional map-based perspective.

21. The machine-readable medium of claim 16, wherein modifying the display effect property of the current game object comprises modifying a game-play behavior of the current game object.

22. The machine-readable medium of claim 16, wherein modifying the display effect property comprises using a table and a positioning of the set of proximate objects relative to the target location to determine a new value for the display effect property of the new game object.

* * * * *